United States Patent
Krimmer et al.

(10) Patent No.: US 7,705,713 B2
(45) Date of Patent: Apr. 27, 2010

(54) CONTROL UNIT HAVING A DEACTIVATABLE INTERFACE

(75) Inventors: Stefan Krimmer, Markt Indersdorf (DE); Rainer Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 482 days.

(21) Appl. No.: 11/453,911

(22) Filed: Jun. 16, 2006

(65) Prior Publication Data

US 2006/0235588 A1 Oct. 19, 2006

Related U.S. Application Data

(63) Continuation of application No. PCT/EP2004/012294, filed on Oct. 29, 2004.

(30) Foreign Application Priority Data

Dec. 18, 2003 (DE) ................. 103 59 487

(51) Int. Cl.
   *B60R 25/10* (2006.01)
(52) U.S. Cl. ............. 340/426.11; 340/3.1; 340/426.13; 340/426.14
(58) Field of Classification Search ............ 340/426.11, 340/3.1, 426.13, 426.19
   See application file for complete search history.

(56) References Cited

U.S. PATENT DOCUMENTS

| 5,794,735 | A  | 8/1998  | Sigl           |
| 6,490,491 | B1 | 12/2002 | Hartmann et al.|
| 6,604,037 | B1 | 8/2003  | Hauptmann et al.|
| 2002/0156554 | A1 | 10/2002 | May et al. |

FOREIGN PATENT DOCUMENTS

| DE | 4338399   | A1 |   | 5/1995  |
| DE | 4422261   | C1 |   | 6/1995  |
| DE | 4422261   | C1 | * | 6/1995  |
| DE | 19757335  | A1 |   | 7/1999  |
| DE | 19833462  | A1 |   | 1/2000  |
| DE | 10009366  | A1 |   | 9/2000  |
| DE | 19933263  | A1 |   | 1/2001  |
| DE | 19949820  | A1 |   | 12/2001 |
| DE | 10113321  | A1 |   | 10/2002 |
| DE | 10118298  | A1 |   | 11/2002 |
| DE | 10129668  | A1 |   | 1/2003  |
| EP | 1187011   | A  | * | 3/2002  |
| EP | 1187011   | A2 |   | 3/2002  |

OTHER PUBLICATIONS

International Search Report for PCT/EP2004/012294 dated Jun. 6, 2005.
German Search Report for 103 59 487.6 dated Aug. 4, 2004.

* cited by examiner

*Primary Examiner*—Travis R Hunnings
(74) *Attorney, Agent, or Firm*—Crowell & Moring LLP

(57) ABSTRACT

A control unit having a microprocessor and at least one electronic memory for storing a program-controlled sequence control for a motor vehicle and a first electronic interface for transmitting the program code of the sequence control from an external data transmission device into the memory and also having a second electronic interface are provided. To prevent manipulation of the contents of the memory, the first electronic interface is irreversibly deactivated after its initial use.

14 Claims, 2 Drawing Sheets

CONTROL UNIT HAVING A DEACTIVATABLE INTERFACE

CROSS REFERENCE TO RELATED APPLICATIONS

This application is a continuation of PCT Application No. PCT/EP2004/012294, filed on Oct. 29, 2004, which claims priority under 35 U.S.C. § 119 to German Patent Application No. 103 59 487.6 filed Dec. 18, 2003, the entire disclosures of which are herein expressly incorporated by reference.

BACKGROUND AND SUMMARY OF THE INVENTION

The invention relates to a control unit for a motor vehicle, an electronic immobilizer and a method for irreversible deactivation of an electronic interface.

Control units for motor vehicles are usually manufactured by automobile suppliers. Before shipping the control units to the respective vehicle manufacturers, the software program, i.e., the sequence control to be executed by the control unit equipped with a microprocessor after being installed in the vehicle by the manufacturer is entered into the electronic memory of the control unit. The traditional control unit has two interfaces. The first interface of the control unit is used for transmitting the sequence control to the memory of the control unit in an operation performed at the suppliers. The second interface is for the vehicle electronics, i.e., the vehicle electric system, to communicate with the control unit after the control unit has been installed in the vehicle. The first interface is often a so-called debugging interface on the circuit board of the control unit which is contacted by needle adapters or the like.

The first interface is no longer needed after the control unit is shipped. Instead, there is a risk that after the control unit has been installed in the vehicle, the control unit might be reprogrammed, i.e., reflashed, via this first interface for the purpose of manipulation. In the case of a control unit that is part of the electronic immobilizer of the vehicle, the manipulation can consist of canceling, i.e., reprogramming the electronic immobilizer. Another manipulation is so-called chip tuning, i.e., use of a modified engine control for the purpose of increasing power and with the disadvantage of a shortened lifetime. Finally, the manipulation may consist of changing the mileage reading to obtain a higher selling price for the vehicle.

If the vehicle manufacturer has already installed the control unit in the vehicle, said control unit having been equipped by the supplier with a sequence control, the control unit is furnished with manufacturer data using security codes via the plug-in diagnostic connection.

The object of this invention is to prevent manipulations on the data present in a control unit for a vehicle.

This object is achieved by a control unit, an electronic immobilizer and a method for irreversible deactivation of an electronic interface. Advantageous embodiments of the invention are described below.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE DRAWINGS

Figure 1:
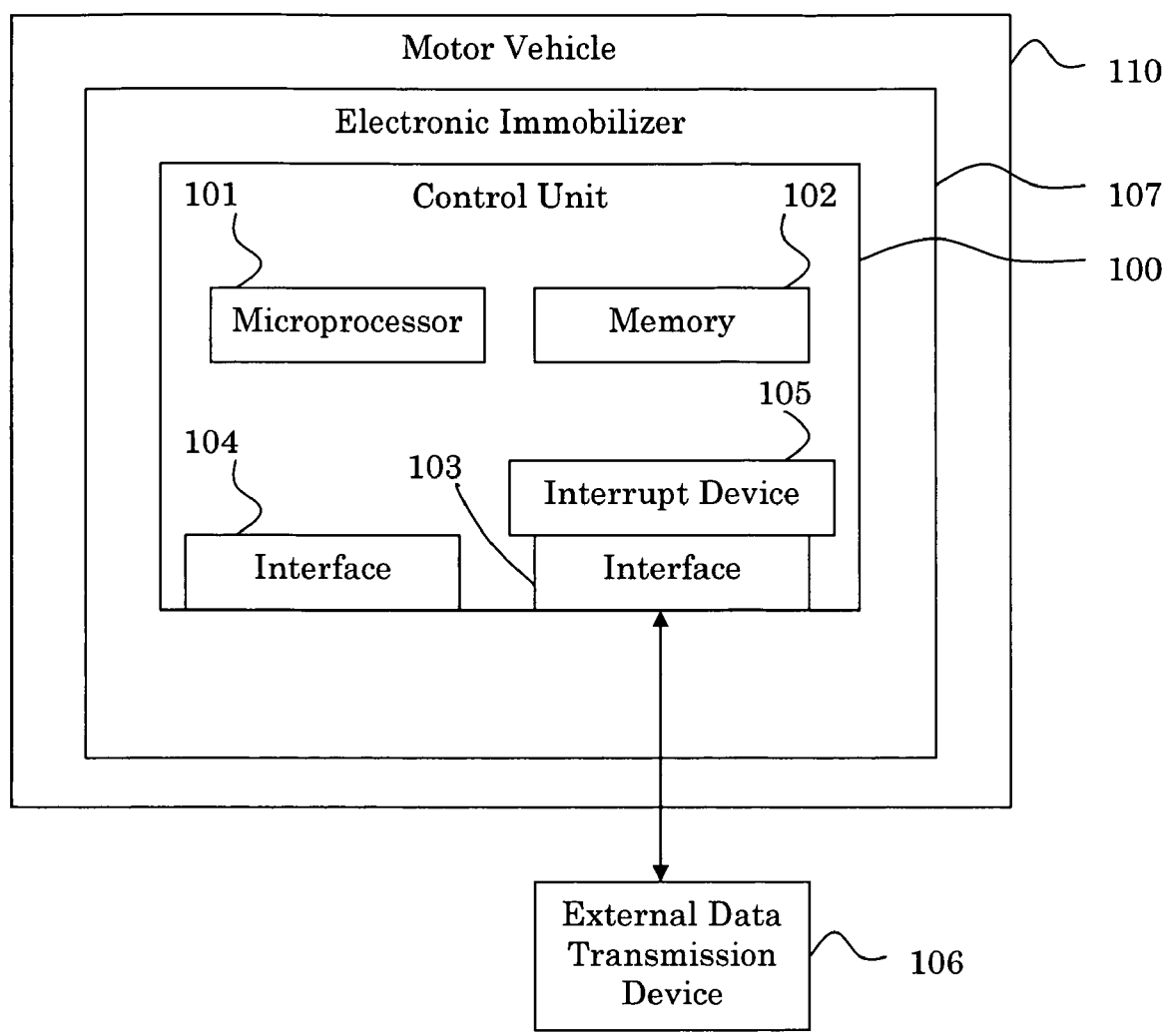
FIG. 1 illustrates an exemplary embodiment of a control unit in accordance with the present invention.

FIG. 1 illustrates an exemplary embodiment of a control unit in accordance with the present invention. An important aspect of the present invention in the case of a control unit 100 having a microprocessor 101 and at least one electronic memory 102 for storing a programmed-controlled sequence control for a motor vehicle 110 and a first electronic interface 103 for transmitting the program code of the sequence control from an external data transmission device 106 into the memory 102 and a second electronic interface 104 consists of the fact that the first electronic interface 103 is irreversibly deactivated.

It is advantageous here that the first interface 103 continues to fulfill the function intended for it by the supplier of the control unit 100 and is deactivated after fulfilling this function. Thus, the first interface 103 is no longer available for a potential manipulation if the control unit 100 has been installed in a vehicle 110.

Alternatively or additionally in one embodiment of the present invention, the control unit 100 forms a part of an electronic immobilizer 107. Protection against manipulation via the second interface 104 is especially important with an immobilizer 107.

Alternatively or additionally in another embodiment of the invention, the control unit is designed in such a way that security-critical data can be read out only via an intact first electronic interface.

Alternatively or additionally in another embodiment of this invention, the electronic memory can be accessed via the second electronic interface only by using a code authorizing the access.

Alternatively or additionally in another embodiment of this invention, read and/or write access to the electronic memory is possible via the second electronic interface.

As a result of these measures, unprotected access to security-relevant data in the control unit is prevented and controlled access is enabled.

Alternatively or additionally in another embodiment of this invention, the first electronic interface is provided with electric terminals and the electronic interface is irreversibly deactivated by at least partially removing it physically. It is also possible to deactivate the first electronic interface by milling, lasering, vaporizing or gluing to remove or block accessible contact faces. These measures make it possible to nevertheless be able to deactivate the interface in a simple and nevertheless inexpensive manner after it has fulfilled its specified purpose.

In another preferred embodiment, a first electronic interface is provided, having an intended perforation line, in particular on the circuit board of the control unit. By mechanically breaking off at least a portion of the first electronic interface along the intended breaking line, the interface can also be deactivated easily and inexpensively.

Alternatively or additionally in another embodiment of the present invention, the first electronic interface is provided with an interrupt device 105 (FIG. 1) having interruptible electric connections. The first electronic interface can be irreversibly deactivated quickly and inexpensively by activating the interrupt device. With a suitably designed interrupt device, this can be accomplished, for example, by applying an excess voltage that induces an interrupt to a semiconductor component.

For the reasons given above, it is especially advantageous if inventive control units are used in electronic immobilizers in vehicles to prevent manipulation or theft.

Figure 2:
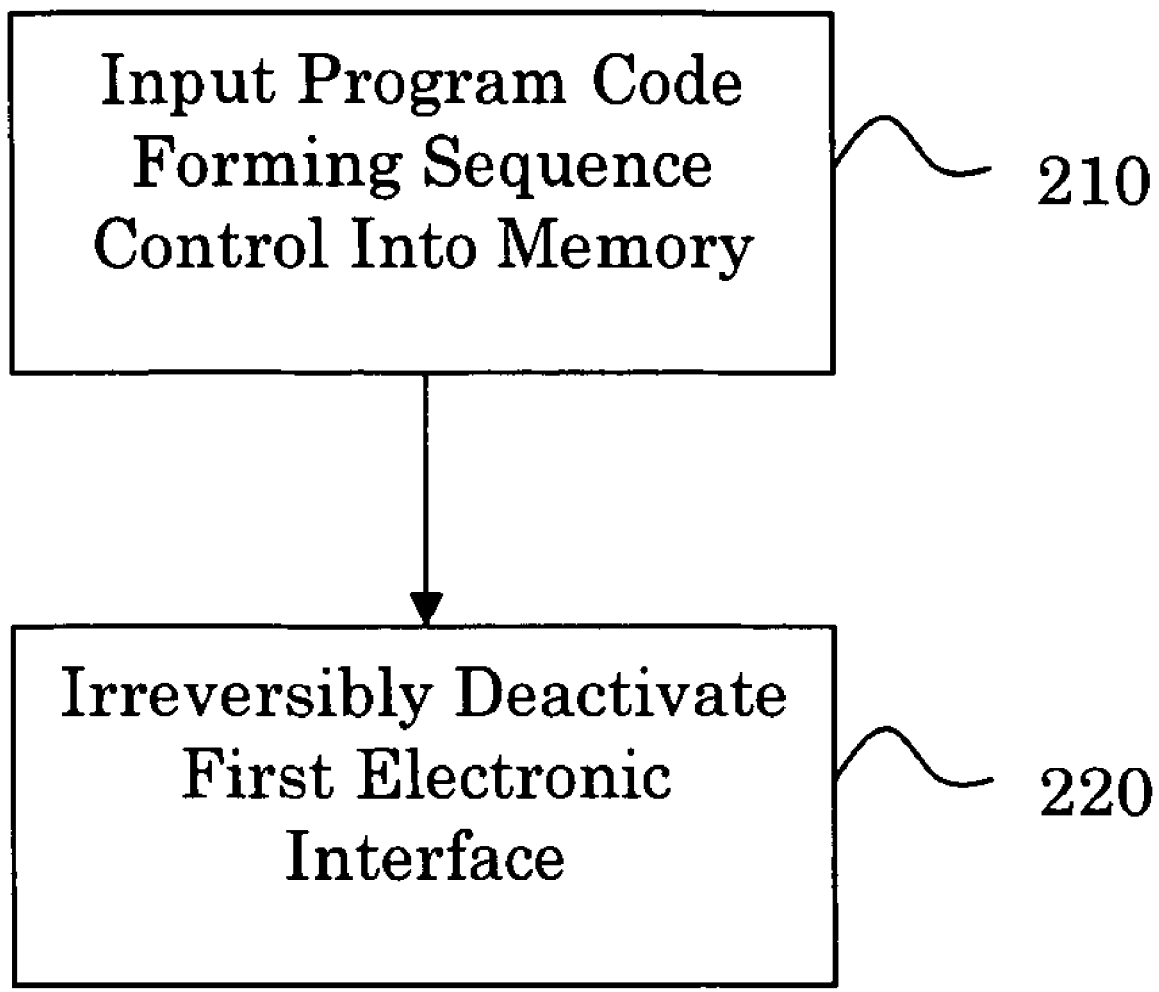
FIG. 2 illustrates an exemplary method in accordance with the present invention.

FIG. 2 illustrates an exemplary method in accordance with the present invention. In an inventive method for irreversible deactivation of a first electronic interface of a control unit having a microprocessor and an electronic memory for program-controlled sequence control and a second electronic interface, the program code forming the sequence control is entered into the electronic memory via the first electronic interface in step 210, and then in step 220 the first electronic interface is irreversibly deactivated.

Alternatively or additionally, in one embodiment of the inventive method, the first electronic interface is provided with electric contacts which are deactivated by milling them off, removing them with a laser, evaporating them or applying adhesive to them.

Alternatively or additionally in one embodiment of this invention, the first electronic interface is provided with an interrupt device which has electric connections that could be interrupted by an overvoltage and irreversibly deactivate the electronic interface by means of an overvoltage.

As a result of this procedure, unauthorized access to security-relevant data in the control unit can be prevented easily, quickly and inexpensively in direct connection to the programming of the control unit via the first interface by the supplier, and thus the possibility of access to safety-relevant data or manipulation of data is ruled out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Control unit comprising:
    a microprocessor;
    at least one electronic memory for storing a program-controlled sequence control for a motor vehicle;
    a first electronic interface for transmitting a program code of the sequence control from an external data transmission device to the memory; and
    a second electronic interface;
    wherein the first electronic interface is irreversibly deactivated,
    wherein the first electronic interface is provided with electric terminals and the first electronic interface is irreversibly deactivated by at least partial physical removal by milling off, removing by laser, vaporizing, gluing or mechanically breaking off a part of the first electronic interface along an intended breaking line of a circuit board of the control unit.

2. Control unit as claimed in claim 1, wherein the control unit forms part of an electronic immobilizer.

3. Control unit as claimed in claim 2, wherein the control unit is designed so that safety-critical data is readable only via the first electronic interface before being deactivated.

4. Control unit as claimed in claim 2, wherein the electronic memory is accessed via the second electronic interface only by using a code that authorizes the access.

5. Control unit as claimed in claim 2, wherein the first electronic interface is provided with an interrupt device which has interruptible electric connections, and the electronic interface is irreversibly deactivated by activating the interrupt device by applying an excess voltage that causes an interrupt.

6. Control unit as claimed in claim 1, wherein the control unit is designed so that safety-critical data is readable only via the first electronic interface before being deactivated.

7. Control unit as claimed in claim 6, wherein the electronic memory is accessed via the second electronic interface only by using a code that authorizes the access.

8. Control unit as claimed in claim 6, wherein the first electronic interface is provided with an interrupt device which has interruptible electric connections, and the electronic interface is irreversibly deactivated by activating the interrupt device by applying an excess voltage that causes an interrupt.

9. Control unit as claimed in claim 1, wherein the electronic memory is accessed via the second electronic interface only by using a code that authorizes the access.

10. Control unit as claimed in claim 9, wherein read or write access to the electronic memory is made possible via the second electronic interface.

11. Control unit as claimed in claim 9, wherein the first electronic interface is provided with an interrupt device which has interruptible electric connections, and the electronic interface is irreversibly deactivated by activating the interrupt device by applying an excess voltage that causes an interrupt.

12. Control unit comprising:
    a microprocessor;
    at least one electronic memory for storing a program-controlled sequence control for a motor vehicle;
    a first electronic interface for transmitting a program code of the sequence control from an external data transmission device to the memory; and
    a second electronic interface;
    wherein the first electronic interface is irreversibly deactivated,
    wherein the first electronic interface is provided with an interrupt device which has interruptible electric connections, and the electronic interface is irreversibly deactivated by activating the interrupt device by applying an excess voltage that causes an interrupt.

13. Electronic immobilizer of a motor vehicle, comprising:
    a control unit, comprising:
        a microprocessor;
        at least one electronic memory for storing a program-controlled sequence control for a motor vehicle;
        a first electronic interface for transmitting a program code of the sequence control from an external data transmission device to the memory; and
        a second electronic interface;
        wherein the first electronic interface is provided with electric terminals and the first electronic interface is irreversibly deactivated by at least partial physical removal by milling off, removing by laser, vaporizing, gluing or mechanically breaking off a part of the first electronic interface along an intended breaking line of a circuit board of the control unit.

14. Method for irreversible deactivation of a first electronic interface of a control unit having a microprocessor and an electronic memory for storing a program-controlled sequence control and a second electronic interface, the method comprising the acts of:
    inputting a program code forming the sequence control into the electronic memory via the first electronic interface; and irreversibly deactivating the first electronic interface after inputting the program code,
wherein the first electronic interface is provided with electric contacts which are deactivated by milling off, removing with a laser, vaporizing or applying adhesive, or the first electronic interface is provided with an interrupt device which has electric connections that are configured to be interrupted by excess voltage and the electronic interface is irreversibly deactivated due to excess voltage.

* * * * *